C. HAMBUECHEN.
DRY CELL.
APPLICATION FILED JUNE 15, 1918.
1,375,632.
Patented Apr. 19, 1921.
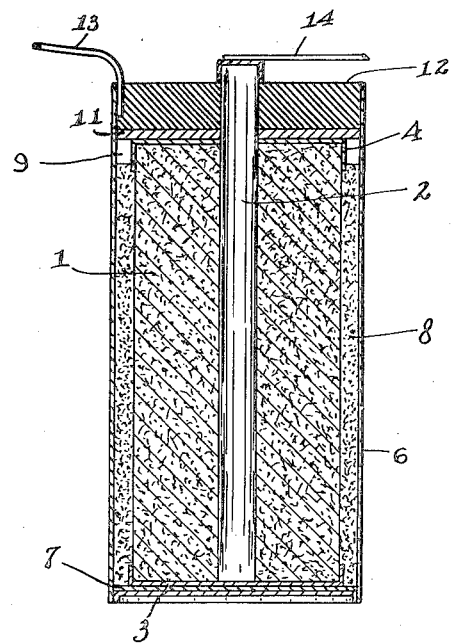
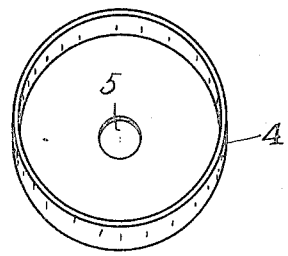
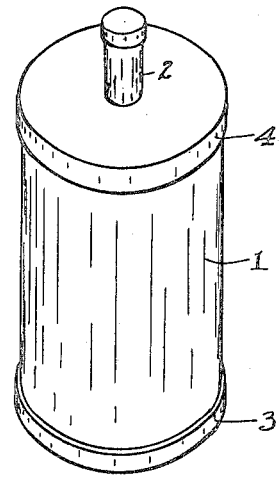
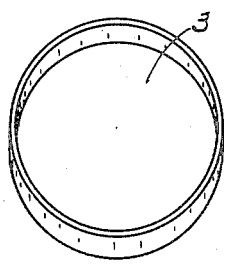
INVENTOR.
CARL HAMBUECHEN
BY Ira J. Adams.
ATTORNEY

UNITED STATES PATENT OFFICE.

CARL HAMBUECHEN, OF BELLEVILLE, ILLINOIS, ASSIGNOR TO NATIONAL CARBON COMPANY, INC., A CORPORATION OF NEW YORK.

DRY CELL.

1,375,632.

Specification of Letters Patent.

Patented Apr. 19, 1921.

Application filed June 15, 1918. Serial No. 240,216.

*To all whom it may concern:*

Be it known that I, CARL HAMBUECHEN, a citizen of the United States, residing at Belleville, in the county of St. Clair and State of Illinois, have invented a certain new and useful Improvement in Dry Cells, of which the following is a full, clear, and exact description.

This invention relates to electric batteries of the dry cell type and more particularly to means for spacing the negative from the positive element.

The invention is applicable to any size of dry cell, but it will be described with particular reference to so-called miniature cells such as are used in flashlights.

In making miniature cells it is usual to mold a mix of pulverulent carbon and manganese peroxid depolarizer around a central carbon rod, and then to wrap cheese-cloth or equivalent material around the molded cartridge to prevent the mix from reaching the zinc can which contains the molded element. After the element is assembled in the zinc can, which is the positive electrode, it is usual to pour flour paste in the annular space between the two. My invention is an improvement over prior cells by virtue of the fact that the cheese-cloth wrapping is entirely dispensed with, as is described in the appended specification, reference being had to the drawings in which:

Figure 1 is a section of a miniature type of dry cell showing my improvement.

Fig. 2 is a perspective view of the negative cartridge of the cell.

Fig. 3 is a perspective view of the bottom cap of the negative element.

Fig. 4 is a perspective view of the top cap of the negative element.

Referring to the drawings, the negative element is formed by molding a depolarizing mix of pulverulent carbon and manganese peroxid 1 around a central carbon electrode 2, preferably in cylindrical form as shown in Fig. 2. After the cartridge is molded a paper cap 3 is formed, of sufficient diameter to snugly fit over the lower end of the cartridge, and a similar cap 4 having a central hole 5 is fitted over the top.

The cartridge is next placed in the zinc can electrode 6, with the cap 3 resting on the bottom of the can or on a cardboard washer 7 which may be paraffined. Flour paste is then poured into the can. The negative element shown in Fig. 2 is next placed into the can until it rests on the paraffined washer. This action forces the paste up around the cartridge to partially fill the annular space between the cartridge and zinc. Additional flour paste 8 is then poured into the annular space until it is substantially filled. A cardboard or chipboard disk 11 is placed in the top of the can with a small air space 9 underneath, and the cell is completed by pouring a pitch or analogous seal 12 on top of the disk 11. The positive and negative connectors 13 and 14 respectively may be connected up in any desired way to complete the battery of cells which forms no part of this invention.

It has been found that a dry cell made in this way without a lining gives very satisfactory service and practical tests have shown that no evil effects are experienced by dispensing with the cheese-cloth wrapping or other lining. The corners of the cartridge or molded mass of pulverous material, if unprotected, would be liable to loosen from handling, or crumble under the softening action of the paste in the cell, and particles might disengage and ultimately reach the zinc electrode. This of course would cause local action, and to prevent the loosening of the particles at the edge 1 I protect the same by means of the paper caps previously described. I have found that when the edges are protected in this way there is no danger of particles of the mix reaching the zinc. The flanges on the cap also have the function of preventing the cartridge from coming in contact with the zinc during the manufacture of a cell before the top washer and seal are applied to rigidly hold the upper end in place. These flanges are short and do not increase the resistance of the cell to any extent.

It will be seen that by means of my improvement the manufacturing cost will be reduced, as the wrapping of cheese-cloth around the cartridge is entirely eliminated, and the electrical action of the cell is improved on account of the absence of the cheese-cloth which merely occupies space and can have no electrochemical effect in the battery. Furthermore, the absence of the cheese-cloth tends to reduce slightly the resistance of the battery.

As a variation in the described steps of manufacture, the cap may be placed in the bottom of the cartridge mold and the cartridge then molded directly into the cap.

Having described my invention, what I claim is:—

1. In dry cells, a container electrode, an unwrapped negative element therein, and protecting caps fitting over each end of the element to prevent particles of said elements becoming disengaged and to space said element from the container electrode.

2. In dry cells, a container electrode, an unwrapped negative element therein, protecting caps fitting over each end of the element to prevent disengagement of particles of the element and to space the same from the container electrode, and flour and water paste entirely filling the annular space between the container electrode and said element.

3. In dry cells, a container electrode, an unwrapped depolarizing cartridge therein, non-conducting caps fitting over each end of the element to prevent the disengagement of particles therein and to space the same from the container electrode, and flour paste entirely filling the annular space between the container electrode and said element.

4. A dry cell comprising, in combination, a container electrode, an electrode therein comprising an unwrapped molded mass, means at the opposite ends of said mass for protecting the same against dislodgment of particles thereof, and flour paste or the like between said electrodes and contacting directly with the unwrapped or bare surface of said mass between such protecting means.

5. A dry cell comprising, in combination, a container electrode, an electrode therein comprising an unwrapped molded mass, caps fitting over the opposite ends of said mass and protecting the same against dislodgment of particles thereof and against contact thereof with said container electrode, and flour paste or the like between said electrodes and contacting directly with the unwrapped surface between the caps on such inner electrode.

6. A dry cell comprising, in combination, a positive container electrode, a negative electrode therein comprising a substantially central carbon rod, a substantially cylindrical depolarizing mass of pulverous material disposed around a portion of said rod, non-conducting flanged caps closely fitting the opposite ends of said mass and protecting said mass against dislodgment of particles thereof and against contact thereof with said container electrode, and flour paste between said positive and negative electrodes and contacting directly with the unwrapped or bare outer surface of said mass between the flanges of said caps thereon.

In testimony whereof I hereunto affix my signature.

CARL HAMBUECHEN.